United States Patent
Berdoyes et al.

(10) Patent No.: US 6,170,256 B1
(45) Date of Patent: Jan. 9, 2001

(54) ANCHOR DEVICE FOR A MEMBER FOR ACTUATING A STEERABLE NOZZLE

(75) Inventors: Michel Berdoyes, Cestas; Pierre Camy, St Medard En Jalles, both of (FR)

(73) Assignee: Societe Nationale d'Etude et de Construction de Moteurs d'Aviation - S.N.E.C.M.A., Paris (FR)

( * ) Notice: Under 35 U.S.C. 154(b), the term of this patent shall be extended for 0 days.

(21) Appl. No.: 09/445,501

(22) PCT Filed: Apr. 9, 1999

(86) PCT No.: PCT/FR99/00819

§ 371 Date: Dec. 8, 1999

§ 102(e) Date: Dec. 8, 1999

(87) PCT Pub. No.: WO99/53185

PCT Pub. Date: Oct. 21, 1999

(30) Foreign Application Priority Data

Apr. 9, 1998 (FR) .................................................. 98 04437

(51) Int. Cl.[7] ....................................................... F02K 1/00
(52) U.S. Cl. ......................................... 60/232; 239/265.35
(58) Field of Search ........................ 60/232; 239/265.11, 239/265.33, 265.35

(56) References Cited

U.S. PATENT DOCUMENTS

| | | |
|---|---|---|
| 3,188,961 | 6/1965 | Scruggs et al. . |
| 3,285,520 * | 11/1966 | Johnson ........................... 239/265.35 |
| 3,361,362 | 1/1968 | Edwards . |
| 3,390,899 | 7/1968 | Herbert et al. . |
| 3,436,021 | 4/1969 | Walton et al. . |
| 3,604,628 | 9/1971 | Haynie, Jr. . |
| 3,659,788 | 5/1972 | Oldfield et al. . |
| 3,860,134 | 1/1975 | Kobalter . |
| 4,452,038 | 6/1984 | Solignyt . |
| 4,477,025 | 10/1984 | Calabro et al. . |

FOREIGN PATENT DOCUMENTS

| | | |
|---|---|---|
| 2350103 | 4/1975 | (DE) . |
| 1554059 | 1/1969 | (FR) . |

* cited by examiner

Primary Examiner—Timothy S. Thorpe
Assistant Examiner—Ehud Gartenberg
(74) Attorney, Agent, or Firm—Weingarten, Schurgin, Gagnebin & Hayes LLP

(57) ABSTRACT

A fitting (22) connected to an actuator member (18a) is mounted on a diverging portion (12) by means of inserts (32) designed to be placed and held in the wall of the diverging portion, and fixing means which comprises an elastically-deformable element (24) designed to compensate for any dimensional variations of thermal origin to maintain a force pressing the fitting (22) against the diverging portion (12). A thrust element (26) is connected to the inserts (32) in such a manner as to compress the elastically-deformable element (24) between the thrust element (26) and the fitting (22).

14 Claims, 2 Drawing Sheets

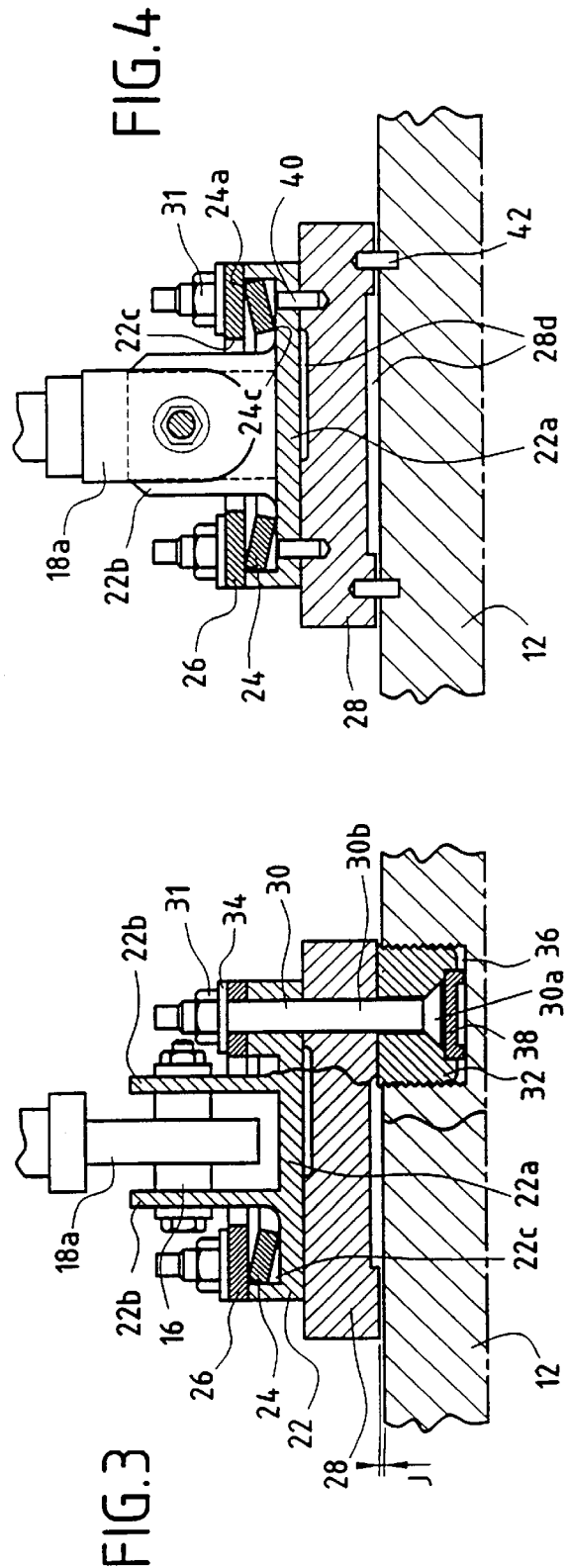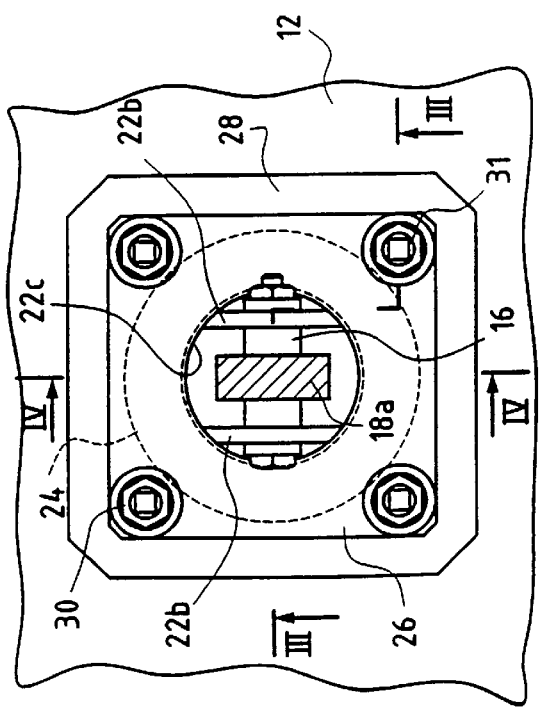

ANCHOR DEVICE FOR A MEMBER FOR ACTUATING A STEERABLE NOZZLE

FIELD OF THE INVENTION

The invention relates in general terms to thrusters having steerable nozzles. More particularly, the invention relates to anchoring an actuator member on the wall of the diverging portion of the nozzle to enable the nozzle to be steered in a desired direction.

BACKGROUND OF THE INVENTION

In a steerable-nozzle thruster, nozzle steering is controlled by actuator members, for example piston-and cylinder type actuators, which are connected at one end to the nozzle via a pivoting link connected to the wall of the diverging portion of the nozzle.

In general, the actuator member is anchored to the nozzle by means of an actuator ring which surrounds the diverging portion so as to confer the desirable stiffness and provide thermal insulation between the wall of the diverging portion and the metal anchor fitting fixed to the actuator ring.

That solution is expensive, particularly when, for reasons of limiting mass and reinforcing thermal insulation, the actuator ring is made of thermostructural composite material, e.g. a carbon/carbon (C/C) composite. In addition, it is necessary to prevent the actuator ring from moving in axial translation or in rotation. It can be prevented from moving in translation by means of a nut screwed onto the diverging portion, thereby adding another large-sized part.

OBJECTS AND BRIEF SUMMARY OF THE INVENTION

An object of the invention is to provide an anchor device which does not require the use of expensive parts of large size and of non-negligible mass.

Another object of the invention is to provide an anchor device which, throughout the mission of a thruster, guarantees that the anchor point of the actuator member is maintained in the proper geometrical position so as to conserve accurate steering of the nozzle, and comply with the steering function of the thruster in spite of differential expansion due to temperature changes.

Another object of the invention is to provide an anchor device that provides good thermal insulation between the nozzle and the anchor point of the actuator member.

These objects can be achieved by an anchor device for an actuator member for steering the diverging portion of a nozzle, the anchor device comprising at least one fitting to provide a link with an actuator member and mounting means for mounting the fitting on the diverging portion, in which device the mounting means comprise at least one insert designed to be placed and held in the wall of a diverging portion, and fixing means comprising at least one elastically-deformable element designed to compensate for any dimensional variations of thermal origin so as to maintain a force pressing the fitting against a diverging portion.

Advantageously, the or each insert is made of a thermally-insulating material, e.g. a thermostructural composite material.

According to a feature of the anchor device, the fixing means comprise a thrust element which is connected to the insert or to each insert in such a manner as to compress the or each elastically-deformable element between the thrust element and the fitting.

According to another feature, a spacer is interposed between the fitting and the outside surface of the diverging portion. The spacer is advantageously made of thermally-insulating material.

Other features and advantages of the anchor device of the invention will appear on reading the following detailed description.

BRIEF DESCRIPTION OF THE DRAWINGS

FIG. 2 is a view on a larger scale of the anchor device in section on plane II—II of FIG. 1; and FIGS. 3 and 4 are section views on planes III—III and IV—IV of FIG. 2.

DETAILED DESCRIPTION OF AN EMBODIMENT

Figure 1:
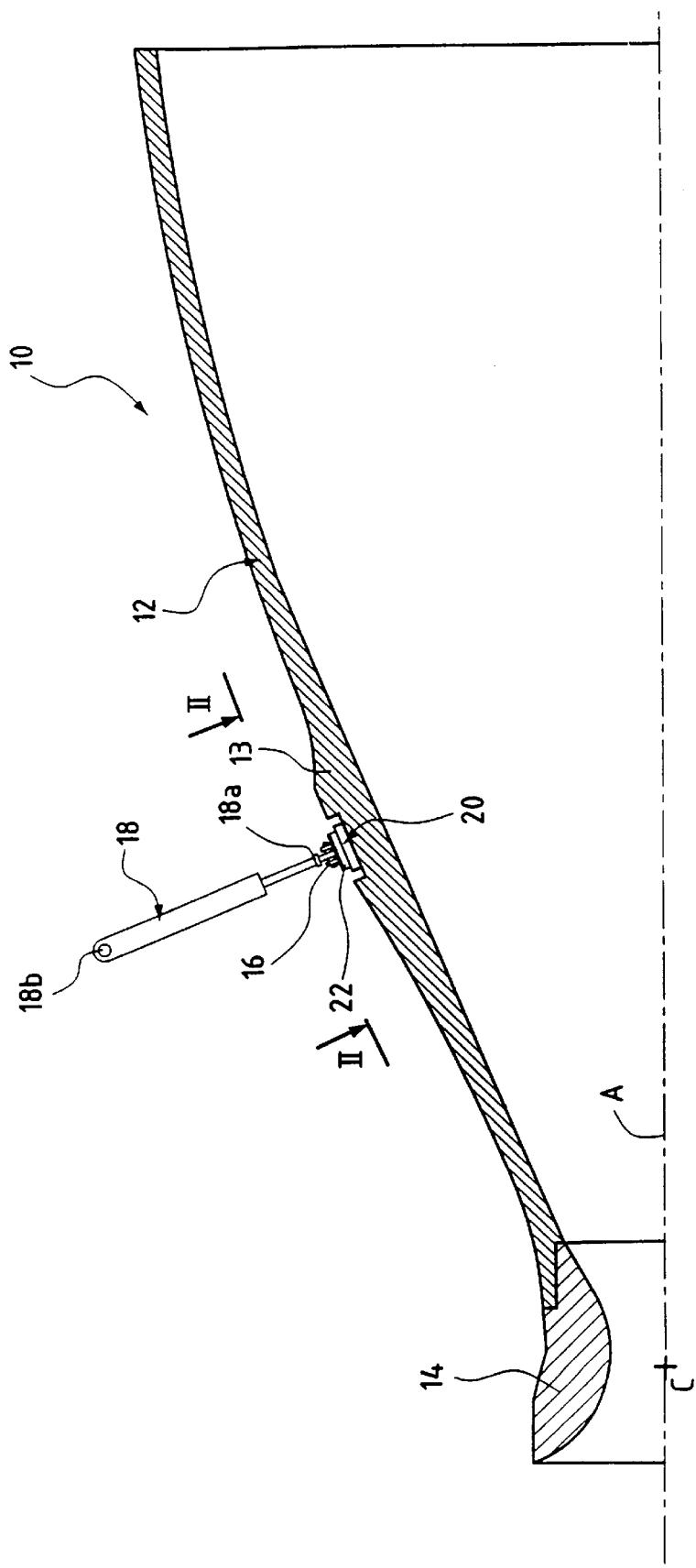
FIG. 1 is a meridian half-section view of a thruster nozzle fitted with anchor devices of the invention.

FIG. 1 shows a nozzle 10 that includes a diverging portion 12 which is fixed, e.g. by screwing, to a throat-forming portion 14. In conventional manner, the throat of the nozzle is connected to the end structure of a thruster (not shown) via a flexible abutment allowing the nozzle to pivot about a center of rotation C that is situated on the axis A of the nozzle. The diverging portion 12 is generally made of composite material. In particular, the diverging portion 12 can be made of thermostructural composite material, such as a carbon/carbon composite (having fiber reinforcement of carbon that is densified with a matrix of carbon) or a ceramic matrix composite (having refractory fiber reinforcement, e.g. of carbon fibers or of ceramic fibers, densified by a ceramic matrix).

A plurality of anchor devices for actuator members are mounted on the diverging portion. In FIG. 1, only one anchor device 20 is shown. To steer the nozzle in any desired direction, at least two anchor devices are provided at angular positions around the axis A that are spaced apart from each other by an angle other than 180°, e.g. an angle of 90°.

The anchor devices 20 are disposed on the diverging portion at a location where it has greatest wall thickness, said greatest thickness being the result of the thickness of the wall increasing progressively.

Each anchor device 20 comprises a metal fitting 22 for coupling purposes which supports a pin 16 that provides a pivoting link with one end 18a of an actuator member 18. In the example shown, the actuator member 18 is a piston-and-cylinder device whose other end 18b is pivotally mounted on a support (not shown) secured to the body of the thruster.

FIGS. 2 to 4 show a presently-preferred embodiment of an anchor device 20 in greater detail.

The fitting 22 comprises a substantially rectangular base 22a, with the pin 16 being supported by two plates 22b projecting from the central portion of the base 22a. An annular recess 22c is formed around the plates 22b in the top surface of the base 22a.

An elastically-deformable element 24 constituted by a metal ring is disposed in the recess 22c. The ring 24 has frustoconically-shaped faces forming a non-zero angle with the normal to the axis of the annular recess 22c.

The size and shape of the ring 24 are chosen so that when it is in the free state, one of the top edges of the ring 24 projects above the surface of the base 22a, e.g. the outer edge 24a of the ring.

The ring 24 is compressed inside the recess 22c by means of a thrust element 26 in the form of a cover plate pressed against the top surface of the base 22a. As a result, the ring 24 has its outer top edge 24a pressing against the cover plate 26 and its inner bottom edge 24c pressing against the base 22a at the bottom of the recess 22c, with the ring being elastically deformed.

A spacer 28 is interposed between the fitting 22 and the diverging portion 12.

The cover plate 26 is pressed against the fitting 22 and the fitting 22 is pressed together with the spacer 28 against the diverging portion 12 by means of bolts 30 and nuts 31. Each bolt 30 has a head 30a engaged in a milled or countersunk portion formed in an insert 32 which is inserted and locked in the wall of the diverging portion 12, and its shank 30b passes through the spacer 28, the base 22a, and the cover plate 26. The nuts 31 are engaged on the ends of the shanks 30b and press against the cover plate 26 via metal washers 34.

Each insert 32 is a part of cylindrical shape that is held in a blind housing 36 formed in the thickness of the diverging portion 12 from its outside surface. By way of example, each insert is screwed and glued in its housing 36. A cup 38 placed at the bottom of each insert 32 covers the head 30a of the bolt.

The inserts 32 project slightly from the outside surface of the diverging portion 12, and the spacer 28 bears against the outside faces of the inserts, leaving clearance J relative to the surface of the diverging portion.

Pegs 40, e.g. two pegs, are received in blind holes in alignment that are formed in the contacting faces of the spacer 28 and the base 22a. Other pegs 42, e.g. likewise two pegs, are received in blind holes in alignment formed in the facing faces of the spacer 28 and the diverging portion 12.

In operation, the gases ejected through the nozzle cause the wall of the diverging portion 12 to heat up considerably. This wall is made of a composite material having a coefficient of thermal expansion that is different from that of the metal material constituting the fitting. It is therefore necessary to protect the elements of the anchor device, and in particular the fitting 22, against excessive heating and to compensate for differential expansion. It is also important, in spite of such differential expansion, to keep the fitting 22 pressed against the diverging portion so as to avoid any drift in the position of the anchor point of the actuator member, thereby avoiding any inaccuracy in the steering of the nozzle, i.e. any departure from the intended steering direction.

Thus, the function of the spacer 28 is to isolate the fitting 22 thermally from the diverging portion 12. The spacer 28 is advantageously made of thermostructural composite material, such as a carbon/carbon (C/C) composite or a ceramic matrix composite (CMC). The thermal insulation function of the spacer 28 can be reinforced by machining setbacks 28a and 28b in its faces facing the wall of the diverging portion 12 and facing the base 22a.

The bolts 30 and the nuts 31 are made of a metal or a metal alloy that is preferably refractory and that has a small coefficient of thermal expansion. Nevertheless, it is desirable to isolate them thermally from the diverging portion 12. This isolation is provided by the inserts 32 which are advantageously made of C/C or CMC composites, as are the cups 38 which protect the heads 30a.

The fitting 22, the cover plate 26, and the ring 24 are made of a metal or a metal alloy that withstands high temperatures, for example an alloy of the "Inconel®" type such as the alloy sold under the reference "Haynes® alloy No. 718" by the American company Haynes International Inc., Kokomo, Indiana. The washers 34 can also be made of the same alloy. Other refractory metals or metal alloys can also be envisaged.

Even in the event of the metal elements expanding, the configuration used makes it possible to keep the fitting 22 pressed against the diverging portion 12, because of the resilient prestress exerted on the ring 24. The ring thus serves to regulate the force pressing against the diverging portion.

The pegs 40, 42 can be made of a material that is identical or similar to that of the bolts 30 and the nuts 31. When a steering force is applied to the nozzle by means of the actuator member connected to the fitting 22, the pegs 40, 42 transfer the induced slip force. They thus prevent the fitting 22 or the spacer 28 from sliding or turning. In addition, the pegs 40, 42, by taking up shear forces, ensure that the stresses to which the bolts 30 are subject are essentially in traction only.

Pressing the spacer 28 against the insert 32 instead of directly against the wall of the diverging portion makes it possible to limit the shear forces on the threads of the inserts.

The greater thickness of the diverging portion 12 where the anchor devices 20 are installed serves to increase stiffness at the thrust points of the actuator members, and thus to avoid deformation which could interfere with the behavior of the nozzle and the accuracy with which it is steered.

The above-described embodiments can be varied in several ways. Thus, the ring 24 can be replaced by a plurality of elastically-deformable elements, e.g. washers disposed in recesses formed in the base where the bolts 30 pass through it. Also, the bolt heads could be anchored in a single insert fixed in the wall of the diverging portion and against which the spacer 28 can bear.

What is claimed is:

1. An anchor device for an actuator member for steering the diverging portion of a nozzle, the anchor device comprising at least one fitting to provide a link with an actuator member and mounting means for mounting the fitting on the diverging portion, the device being characterized in that the mounting means comprise at least one insert designed to be placed and held in the wall of a diverging portion, and fixing means comprising at least one elastically-deformable element designed to compensate for any dimensional variations of thermal origin so as to maintain a force pressing the fitting against a diverging portion.

2. A device according to claim 1, characterized in that the or each insert is made of a thermally-insulating material.

3. A device according to claim 2, characterized in that the or each insert is made of a thermostructural composite material.

4. A device according to claim 1 characterized in that the fixing means comprise a thrust element which is connected to the insert or to each insert in such a manner as to compress the or each elastically-deformable element between the thrust element and the fitting.

5. A device according to claim 1, characterized in that the or each elastically-deformable element is disposed in a recess formed in the fitting.

6. A device according to claim 1, characterized in that it includes a spacer to be interposed between the fitting and the wall of a diverging portion.

7. A device according to claim 6, characterized in that the spacer is made of a thermally-insulating material.

8. A device according to claim 7, characterized in that the spacer is made of a thermostructural composite material.

9. A device according to claim 6, characterized in that the spacer rests on the or each insert.

10. A steerable nozzle having a diverging portion provided with at least one anchor device according to claim 1, characterized in that the or each insert is disposed in a zone of the diverging portion where the wall thereof is of thickness greater than in other zones of the diverging portion.

11. A steerable nozzle according to claim 10, characterized in that the zone of greater wall thickness connects progressively with adjacent zones of lesser thickness.

12. A steerable nozzle according to claim 10, characterized in that the or each insert is screwed and glued inside a housing formed in the wall of the diverging portion.

13. A device according to claim 3, characterized in that:

the fixing means comprise a thrust element which is connected to the insert or to each insert in such a manner as to compress the or each elastically-deformable element between the thrust element and the fitting;

the or each elastically-deformable element is disposed in a recess formed in the fitting;

it includes a spacer to be of a thermally-insulating, thermostructural composite material interposed between the fitting and the wall of a diverging portion; and the spacer rests on the or each insert.

14. A steerable nozzle having a diverging portion provided with at least one anchor device according to claim 13, characterized in that:

the or each insert is disposed in a zone of the diverging portion where the wall thereof is of thickness greater than in other zones of the diverging portion;

the zone of greater wall thickness connects progressively with adjacent zones of lesser thickness; and the or each insert is screwed and glued inside a housing formed in the wall of the diverging portion.

* * * * *